(12) United States Patent
Hedström

(10) Patent No.: US 6,601,309 B1
(45) Date of Patent: Aug. 5, 2003

(54) APPARATUS FOR MARKING BY LIGHT PLANES A CORNER ANGLE IN A WORK AREA

(75) Inventor: Hans Hedström, Stockholm (SE)

(73) Assignee: Megascale AB, Stockholm (SE)

( * ) Notice: Subject to any disclaimer, the term of this patent is extended or adjusted under 35 U.S.C. 154(b) by 0 days.

(21) Appl. No.: 09/926,251

(22) PCT Filed: Mar. 23, 2000

(86) PCT No.: PCT/SE00/00568

§ 371 (c)(1),
(2), (4) Date: Oct. 1, 2001

(87) PCT Pub. No.: WO00/60400

PCT Pub. Date: Oct. 12, 2000

(30) Foreign Application Priority Data

Apr. 1, 1999 (SE) ................................................ 9901228

(51) Int. Cl.[7] ............................................. G01C 15/00
(52) U.S. Cl. ..................... 33/286; 33/DIG. 21; 33/279; 33/404; 356/622
(58) Field of Search ..................... 33/1 M, 1 N, 276, 33/278, 279, 280, 286, 404, 407, 534, DIG. 21, 281, 285; 356/622

(56) References Cited

U.S. PATENT DOCUMENTS

| 3,250,009 | A | * | 5/1966 | Oseka | ........................ 33/404 |
|---|---|---|---|---|---|
| 3,545,086 | A | * | 12/1970 | Brill et al. | ..................... 33/228 |
| 3,762,820 | A | * | 10/1973 | Zoot et al. | ............... 356/141.1 |
| 3,765,764 | A | * | 10/1973 | Niss | .............................. 356/622 |
| 4,483,618 | A | * | 11/1984 | Hamar | ........................ 356/400 |
| 4,492,471 | A | * | 1/1985 | Wiklund | ...................... 356/622 |
| 4,495,703 | A | | 1/1985 | Sakata et al. | .................. 33/503 |
| 4,598,481 | A | * | 7/1986 | Donahue | ..................... 33/288 |
| 4,663,855 | A | * | 5/1987 | Hamilton et al. | ............. 33/288 |
| 5,402,226 | A | * | 3/1995 | Matthews et al. | ........ 356/141.3 |
| 5,528,505 | A | | 6/1996 | Granger et al. | ............. 700/195 |
| 5,864,956 | A | | 2/1999 | Dong | .......................... 33/227 |

FOREIGN PATENT DOCUMENTS

| WO | 93/15660 | 8/1993 | ........... A61B/10/00 |
|---|---|---|---|
| WO | 98/47035 | 10/1998 | ........... G02B/7/182 |

* cited by examiner

Primary Examiner—Diego Gutierrez
Assistant Examiner—R. Alexander Smith
(74) Attorney, Agent, or Firm—Jacobson Holman PLLC

(57) ABSTRACT

A system for marking a corner angle in a working area with the aid of light planes, wherein a straight, elongate guide is disposed on each respective side of a planar working surface in the working area. Each guide carries a carriage that can be moved to chosen positions alongs its guide. Each carriage carries a laser unit which is adapted to emit a light plane that intersects the working surface, as well as the light plane of the other laser unit, at a chosen angle. Each laser unit is adapted to maintain its light plane in a set orientation relative to the longitudinal axis of its associated guide, regardless of the position to which the carriage has been moved along said guide, and both laser units are adapted to be activated simultaneously for marking said corner angle.

8 Claims, 2 Drawing Sheets

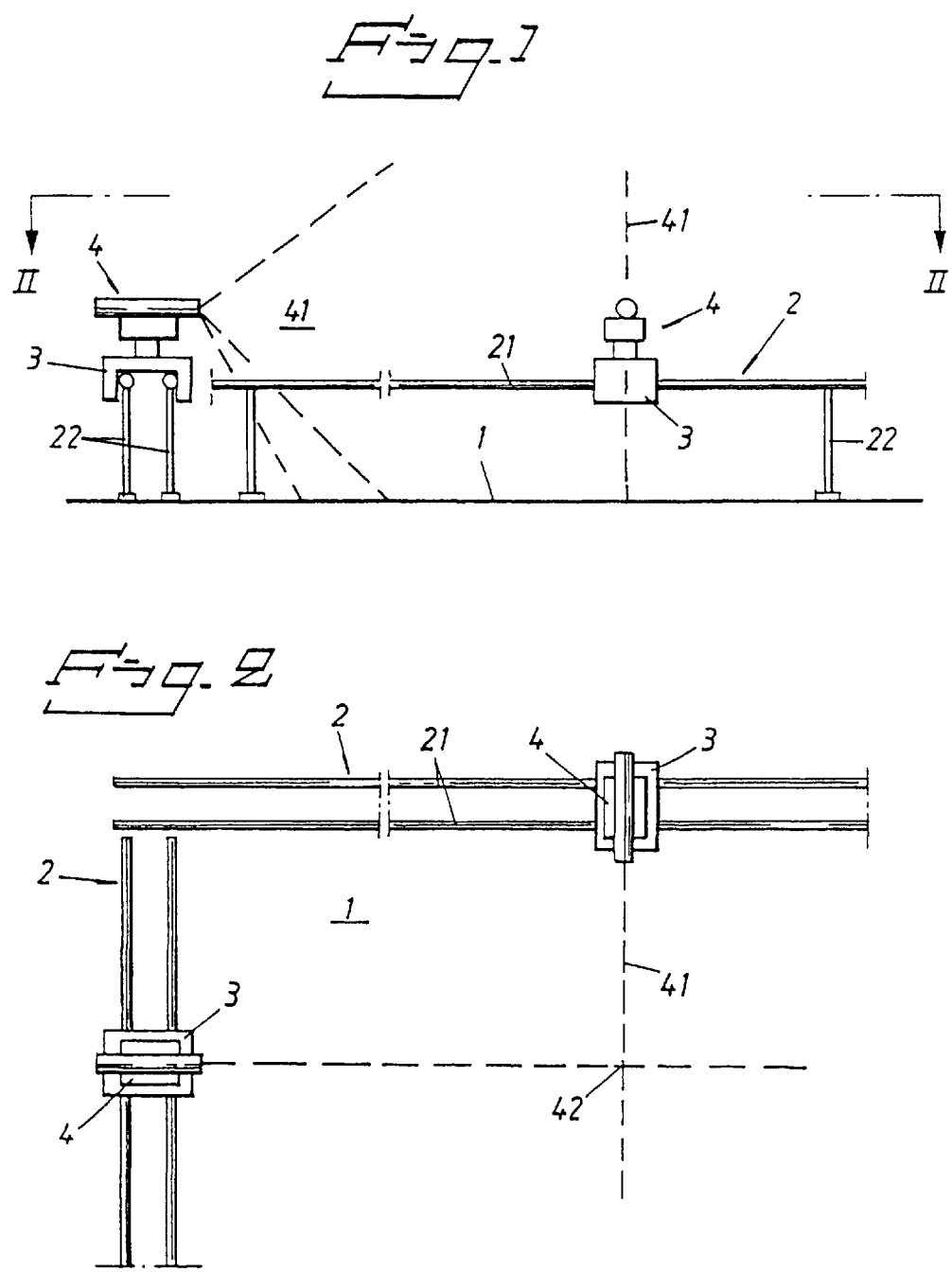

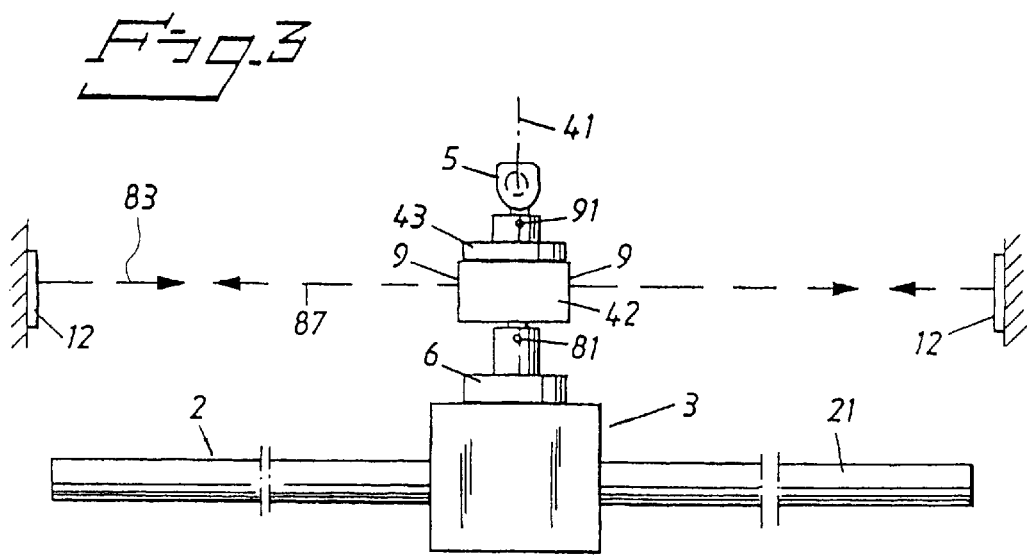
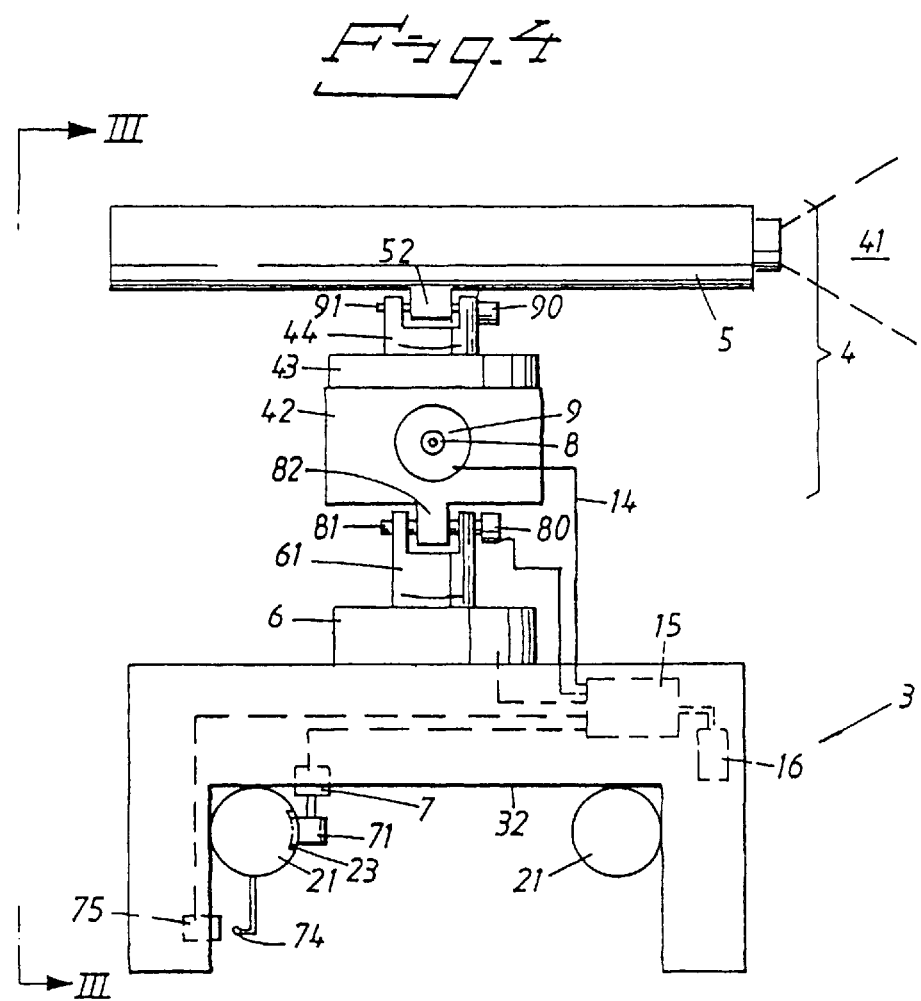

APPARATUS FOR MARKING BY LIGHT PLANES A CORNER ANGLE IN A WORK AREA

This is a nationalization of PCT/SE00/00568, filed Mar. 23, 2000 and published in English.

BACKGROUND OF THE INVENTION

1. Field of the Invention

The present invention relates to a system for marking a corner angle in a working area with the aid of light planes.

2. Description of the Related Art

In the manufacturing industry, and then in particular in the fabrication of large constructions from prefabricated components, it is sometimes difficult or troublesome to place the components together initially in correct orientation and at correct distances apart with respect to each other, prior to joining said components together by some suitable means.

In such manufacturing industries, there is normally access to a large surface area, typically a horizontal working surface (floor), on which the components can be placed in mutually appropriate positions prior to being joined together or interconnected. With the intention of ensuring that the components are positioned correctly with respect to each other, it is known from practice to project onto the working surface from a central overlying point a drawing view corresponding to a scale of 1:1 with the aid of a laser unit. However, there is a danger that the image projected in this way will be wrongly interpreted with respect to component parts that are located above the working surface, due to the fact that the projected light beams are oblique in eccentric parts of the projected image. Furthermore, component parts can, of course, screen-off the projected light beams before said beams reach the working surface. The fact that the direction of the projected light beams relative to the working surface depends on the distance from the projection centre prevents the projected light beams from being used to mark normals to the plane of the working surface. Other reproduction distortions may also occur at distances from the working surface.

SUMMARY OF THE INVENTION

One object of the invention is to provide a system with which the aforesaid drawbacks can be restricted or avoided. Another object of the invention is to provide means that enable the projection devices to be accurately aligned.

A further object of the invention is to provide a system that enables corners and angles to be readily marked with the aid of light beams in positions that can be selected by moving at least two projectors to chosen positions along a respective guide rail.

The setting arrangement of the present invention may further include a reflector such as a mirror at or beyond one end of the guide, and a light emitter which is carried by the chassis of the laser unit and which functions to direct a light beam onto the reflector, the emitter beam being parallel to the reference axis of the guide and the mirror being perpendicular to the reference axis. A light sensor detects the position at which the reflected beam impinges on the light sensor, and a control unit receives a light sensor output signal and controls a setting arrangement such as to hold the light beam reflected by the reflector parallel with the light beam emitted by the emitter.

The laser emitter of the laser unit may be supported in spaced relationship with the chassis of the laser unit through the medium of a suspension device which is adapted to allow the light plane of the laser unit to be set in a chosen orientation relative to the chassis of the laser unit.

The present invention is based on the concept of arranging a straight elongate guide along each side of a planar working surface in said working area, where each guide carries a carriage that can be moved along its guide to selected positions thereon. Each carriage carries a laser that functions to emit a light plane that intersects the working surface at a predetermined angle. The light planes of the two lasers shall also intersect each other at a predetermined angle. It is preferred in many applications to ensure that the plane of the working surface and the planes of the two laser beams intersect each other at right angles.

In other applications, the laser light planes may be perpendicular to the plane of the working surface without necessarily intersecting each other at right angles; the planes, however, conveniently retain their orientation relative to respective guides of the laser arrangement in operation. The planes of the two laser arrangements may, of course, also be set to each take a chosen angle relative to the plane of the working surface.

Each carriage will preferably coact with means for determining the position of said carriage along its guide. The system will also preferably include drive means for driving the carriage to a chosen position along its guide. The carriages may be remote controlled to predetermined positions along respective guides. In this regard, the guide arrangement may include a remote control device, for instance in the form of a hand-controlled terminal that can be carried easily by an operator. The terminal may communicate with a receiver appropriately mounted on the carriage, to send instructions to a control unit or to receive information and send this information to the terminal. The control unit or remote control device may be designed for pre-programming, so as to enable an operator to cause the two laser units to emit laser light planes that mutually intersect at predetermined positions with ease.

In a further embodiment of the invention, at least one of the guides may carry two carriages and associated laser units, for instance to establish two parallel light planes that can be moved relative to each other, either to mark desired positions or to measure distances between two points, or to measure an angle between two edges or surfaces.

In certain embodiments of the invention, the laser unit is supported from the carriage with a setting device that serves to correct laser unit directional errors originating, for instance, from an alignment error between carriage and guide, poor straightness of the guide, temperature-induced deviations, etc.

The laser emitter may also be supported away from the laser unit chassis via setting devices that enable the laser light plane to be set in chosen directions in the vertical plane or in the horizontal plane relative to the reference axis of the guide, while the chassis of the laser unit is ideally held orientated relative to the reference axis by means of said setting device.

BRIEF DESCRIPTION OF THE DRAWINGS

The invention will now be described in more detail by way of example and with reference to the accompanying drawing, in which FIG. 1 is a side view of an inventive system;

FIG. 2 is a plan view of the system taken on the line II—II in FIG. 1;

FIG. 3 is a view taken on the line III—III in FIG. 4; and

FIG. 4 is a broken-out side view of a guide with carriage and laser unit.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 2 shows a planar working surface 1 that has guides 2 which extend along two edge portions of said surface and the longitudinal axes of which are preferably spaced through 90° in the plane of the surface 1. Each guide 2 carries a carriage 3 that can be moved along its respective guide 2. Each carriage 3 carries a laser unit 4 which functions to emit a thin light disc 41 which defines preferably a right angle with the surface 1. In the illustrated case, the guides 2 are supported in spaced relationship with a floor defining the surface 1 on posts 22.

At least one of the guides 2 may carry a further carriage 3 with laser unit 4. The carriages are each provided with a path sensor so that the positions of the carriages 3 along respective guides 2 will always be known. Each carriage 3 may also include drive means 7, 71 for motorised movement of the carriage along its respective guide 2.

As will be evident from FIG. 4, the drive devices may include a motor which is carried by the carriage 3 and which has a drive roller 71 that runs in contact with a rail 21. The roller 71 and the rail 21 may mutually coact via respective cogs or teeth 23. An indication of the position of the carriage 3 along its respective guide 2 can be obtained by detecting the number of turns of the roller 71. The carriage also carries a sensor 75 which detects a position indicator 74 carried in a given position along the rail 21, thereby obtaining a reference of the position of the carriage 3 along the guide 2.

The guide rails 21 are received in respective corner angles of a recess 32 in the carriage 3.

The laser unit 4 is shown to include a chassis 42 which carries a motor 43 that has a vertical rotatable shaft 44. The shaft 44 carries, in turn, a motor 90 which functions to turn a shaft 91 mounted horizontally on the shaft 44 and firmly connected to a bottom part 52 of the laser emitter 5. The laser light plane 41 can be given desired orientation relative to the chassis 42 of the unit 4, by appropriate driving of the motors 43 and 90.

FIG. 4 also shows the chassis 42 supported in spaced relationship with the carriage 3 via a motor 6 that has a vertical rotatable shaft 61. The shaft 61 carries a motor 80 that functions to rotate a horizontal shaft 81 mounted on the shaft 61 and firmly connected to a lower part 82 of the laser unit chassis 42.

The chassis 42 has a light emitter 8 on at least one of its two opposing side. The emitter 8 emits a beam 87 that is parallel with the desired path of movement of the laser unit 4 along its guide 2. The beam 87 is perpendicular to a reflector 12 located beyond an end region of the guide 2, the reflector reflecting the light beam 87 back towards the emitter 8. As will be evident from FIG. 4, the emitter 8 is exposed in the centre of a known light sensor disc 9 which delivers an output signal that depends on the position in which the reflected beam 83 impinges on the disc 9. The output signal from the disc 9 is conducted by a cable 14 to a control unit 15 which functions to control the motors 6 and 80 so as to cause the beam reflected by the mirror 12 to hit as close as possible in the centre of the disc 9. The laser emitter 8 and the control unit in the motor 7, etc. may be powered by a battery 16 carried by the carriage 3. The control unit 15 may communicate with an associated remote control terminal (not shown), through the medium of a radio transmitter/receiver (not shown).

The motors 80 and 43 may be controlled via the control unit 15. Alternatively, the motors 43 and 90 may be replaced with manually settable indexing devices that include associated setting scales.

As shown in FIG. 3, light sensor discs 9 may be disposed on opposite sides of the chassis 42 and have associated central light emitters 8 whose beams are reflected back by respective mirrors 12 at or beyond respective ends of the guide 2.

As before mentioned, the system can be used to mark corners, angles, edge lines or planes or intersections of selected orientations relative to the working surface, although it may, of course, also be used to input corner angles, the position of intersection points and intersection lines, input the directions of edge lines, walls or corners of objects in the working area, distances between points and planes on objects in the working area, the size of a corner angle in the working area, etc.

In the aforegoing, the setting arrangement and carriage arrangement have been described in the form of universal joint devices that can be pivoted or swung about two mutually perpendicular axes with the aid of associated motor devices, although it will be evident that these movements can be achieved in many other ways that are well known to the art.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A system for marking a corner angle in a working area with the aid of light planes, comprising a straight, elongate guide along each side of a planar working surface in the working area, each guide having a carriage that is movable therealong to chosen positions and which carries a laser unit adapted to emit a light plane which intersects the working surface at a chosen angle, respective light planes of said two laser units being arranged to mutually intersect at a chosen angle, the two laser units being adapted to be activated simultaneously for marking said corner angle;

said laser unit supported in spaced relationship with the carriage through a setting arrangement adapted to hold the laser unit parallel with a reference axis parallel with the guide, said setting arrangement including:

a reflector at or beyond one end of the guide;

a light emitter which is carried by the chassis of the laser unit and which functions to direct a light beam onto the reflector, the emitter beam being parallel to the reference axis of the guide and the reflector being perpendicular to the reference axis;

a light sensor detecting a position at which the reflected beam impinges on the light sensor; and a control unit receiving a light sensor output signal and controlling said setting arrangement such as to hold the light beam reflected by the reflector parallel with the light beam emitted by the emitter.

2. The system according to claim 1, wherein the laser units are adjustable to permit their respective light planes to intersect the working surface at right angles and to permit the light planes to mutually intersect at right angles.

3. The system according to claim 1, wherein at least one of the guides carries a further carriage having a laser unit, said two carriages on said guide being movable along the guide relative to one another.

4. The system according to claim 1, wherein the laser emitter of the laser unit is supported in spaced relationship with the chassis of the laser unit through a suspension device which is adapted to allow the light plane of the laser unit to be set in a chosen orientation relative to the chassis of the laser unit.

5. A system for marking a corner angle in a working area with the aid of light planes, comprising:

a straight, elongate guide along each side of a planar working surface in the working area, each guide supporting a movable carriage adjustably positioned thereon;

a laser unit supported on each carriage by a chassis and having a laser emitter adapted to emit a light plane which intersects the working surface at a chosen angle, respective light planes of the laser unit on each carriage being arranged to mutually intersect at a chosen angle;

a reflector at or beyond one end of said guide;

a light emitter which is carried by the chassis of the laser unit and which functions to direct a light beam onto said reflector, the emitted light beam being substantially parallel to the reference axis of the guide and the reflector being substantially perpendicular to the reference axis;

a light sensor detecting a position at which the reflected beam impinges on the light sensor; and a control unit receiving a light sensor output signal and controlling a setting arrangement such as to hold the light beam reflected by the reflector substantially parallel with the light beam emitted by the emitter.

6. The system according to claim 5, wherein the laser units are adjustable to permit their respective light planes to intersect the working surface at right angles and to permit the light planes to mutually intersect at right angles.

7. The system according to claim 5, wherein at least one of the guides carries a further carriage having a laser unit, said two carriages on said guide being movable therealong relative to one another.

8. The system according to claim 5, wherein the laser emitter of the laser unit is supported in spaced relationship with the chassis of the laser unit through a suspension device which allows the light plane of the laser unit to be set in a chosen orientation relative to the chassis of the laser unit.

* * * * *